United States Patent [19]

Toschi et al.

[11] Patent Number: 5,636,652

[45] Date of Patent: Jun. 10, 1997

[54] VALVE FOR A HYDRAULIC ELEVATOR

[75] Inventors: Renzo Toschi, Bologna; Gianluca Foschini, Cervia, both of Italy

[73] Assignee: Otis Elevator Company, Farmington, Conn.

[21] Appl. No.: 395,727

[22] Filed: Feb. 28, 1995

[51] Int. Cl.$^6$ .................................................. F16K 31/02
[52] U.S. Cl. .................. 137/1; 91/448; 187/275; 251/30.02; 251/60; 251/129.12
[58] Field of Search ............................ 91/448; 137/1, 137/269; 187/275; 251/30.02, 60, 129.11, 129.12

[56] References Cited

U.S. PATENT DOCUMENTS

| | | | |
|---|---|---|---|
| 2,664,916 | 1/1954 | Conley | 251/30.02 X |
| 2,977,984 | 4/1961 | Barnes | 137/625.64 |
| 2,997,064 | 8/1961 | Gerwig et al. | 137/625.64 |
| 3,215,158 | 11/1965 | Bass et al. | 137/269 |
| 4,418,794 | 12/1983 | Manco . | |
| 4,526,342 | 7/1985 | Wakefield | 251/129.11 X |
| 4,593,881 | 6/1986 | Yoshino | 251/129.11 X |
| 4,646,785 | 3/1987 | Ruedle et al. | 137/625.64 |
| 4,700,748 | 10/1987 | Fossati et al. | 137/877 |
| 4,726,450 | 2/1988 | Fossati et al. . | |
| 4,819,695 | 4/1989 | Kervagoret | 251/129.11 |
| 5,014,824 | 5/1991 | Fargo . | |
| 5,082,091 | 1/1992 | Fargo . | |
| 5,156,080 | 10/1992 | Pelto-Huikko | 187/275 X |
| 5,212,951 | 5/1993 | Fargo et al. | 60/479 |

FOREIGN PATENT DOCUMENTS

| | | |
|---|---|---|
| 0433769 | 3/1995 | European Pat. Off. . |
| 0433770 | 3/1995 | European Pat. Off. . |
| 2309345 | 9/1974 | Germany . |
| 8606359 | 11/1986 | WIPO . |
| 8901105 | 2/1989 | WIPO . |

Primary Examiner—Gerald A. Michalsky

[57] ABSTRACT

A transition valve for a hydraulic elevator includes a block, a spool, an actuator, and an end cap. The actuator may be either a solenoid type actuator or an electric motor type actuator. The end cap includes an opening permitting engagement between the actuator and the spool. In a particular embodiment, the actuator is an electric motor engaged with the spool via a crank and arm. This arrangement translates the rotational motion of the motor into linear motion of the spool with a sine curve profile.

4 Claims, 4 Drawing Sheets

VALVE FOR A HYDRAULIC ELEVATOR

TECHNICAL FIELD

This invention relates to hydraulic elevators, and more particularly to transition valves used to control the ascent and descent of a hydraulic elevator.

BACKGROUND OF THE INVENTION

Hydraulic elevators are commonly used instead of traction type elevators in low rise applications. The advantage of the hydraulic elevator is its lower cost. This advantage, however, may be offset by the lack of precision control of the ride as compared to traction elevators.

In a typical hydraulic elevator, the flow of fluid to and from a hydraulic cylinder causes the elevator car to ascend and descend within the hoistway. During the ascent operation, the fluid is pumped from a tank by a pump and flows through a control valve before entering the cylinder. During the descent operation, the control valve opens to permit the fluid to flow from the cylinder and into the tank under the pressure of the car.

One type of hydraulic valve commonly used to transition between stopping and full speed includes a valve stem actuated by a solenoid to direct the flow of fluid through the valve. In this type of valve, in order to lower the elevator the solenoid is activated to permit a flow of fluid into a cylinder closed off by a piston. Upon sufficient pressurization of the cylinder, the piston will open to permit fluid flow through the valve and the car to descend. Balancing the fluid pressure on both sides of the valve prior to opening the valve provides a smooth and gentle start to the descent.

A second type of transition valve includes a valve stem actuated by an electric motor. In this type of valve, flow is controlled by a stepper motor that moves a flow control valve. The amount of flow is programmed and controlled through feedback to produce a desired velocity profile for the elevator car. The purpose of the motor actuated control valve is to produce more precise control of the motion of the elevator car and thereby a smoother, safer ride for the passengers that more closely approximates the ride of a traction type elevator. The main drawback to the motor actuated type of control valve is the additional complexity and cost associated with it.

The above art notwithstanding, scientists and engineers under the direction of Applicant's Assignee are working to develop hydraulic elevators that provide the desired control of the car motion without being prohibitively expensive.

DISCLOSURE OF THE INVENTION

According to the present invention, a hydraulic valve includes a block, a spool, means to actuate the spool, and an end cap. The block includes a passage and the spool is disposed for movement within the passage. The end cap is engaged with the block and has an opening for permitting engagement between the spool and the means to engage the spool. The opening faces into the passage.

The feature of the end cap permits the identical block to be used with either a solenoid type actuator or a motor actuator. Specific end caps may be used with specific actuators. As a result of the commonality, the overall cost of the hydraulic valve, whether solenoid actuated or motor actuated, is minimized. Further, the control system for the hydraulic elevator may be easily modified after installation from a solenoid type activator to a motor actuator by changing the end cap and actuator.

According to a specific embodiment of the present invention, the hydraulic valve includes a switching means having a first position and a second position. The block further includes a first pilot flow channel, a second pilot flow channel, and a channel providing fluid communication between an outlet of the first channel and the opening of the end cap. With the switching means in the first position, fluid is directed to flow from the second pilot flow channel into the first pilot flow channel, through the end cap and into the opening and passage. This fluid flow causes the spool to move in a first direction. With the switching means in the second position, fluid communication between the second pilot flow channel and the first pilot flow channel is blocked. Fluid pressure builds within the passage and on the spool. This fluid pressure causes the spool to move in a second direction opposite to the first direction. The switching means may be a solenoid device.

In another particular embodiment, the opening of the end cap is an aperture adapted to permit an arm to extend through the aperture to engage the spool. The arm defines means to actuate the spool and is moved by a controller. The controller may be an electric motor engaged with the arm. In a further particular embodiment, the electric motor is engaged with the arm via a rotating crank. This arrangement translates the rotational motion of the motor, which may be easily kept at a constant speed, into linear motion of the spool with a sine curve speed profile for the spool. The advantage that results from this arrangement is minimized jerk during the deceleration phase without the complex feedback control used with prior art stepper motor type actuators to maintain a predetermined velocity profile.

In a still further particular embodiment, the hydraulic valve includes a second end cap having an aperture and a spool position limiting means inserted through the aperture. In this embodiment, the second end cap provides the advantage of permitting the use of different types of position limiting means with different types of actuators. For solenoid types of actuators, the position limiting means may be a mechanical stop positioned to prevent motion of the spool upon contact with the stop. For motor actuators, the position limiting means may include a projection extending from the spool and through the aperture and a limit switch positioned to be responsive to the projection upon sufficient motion of the spool.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
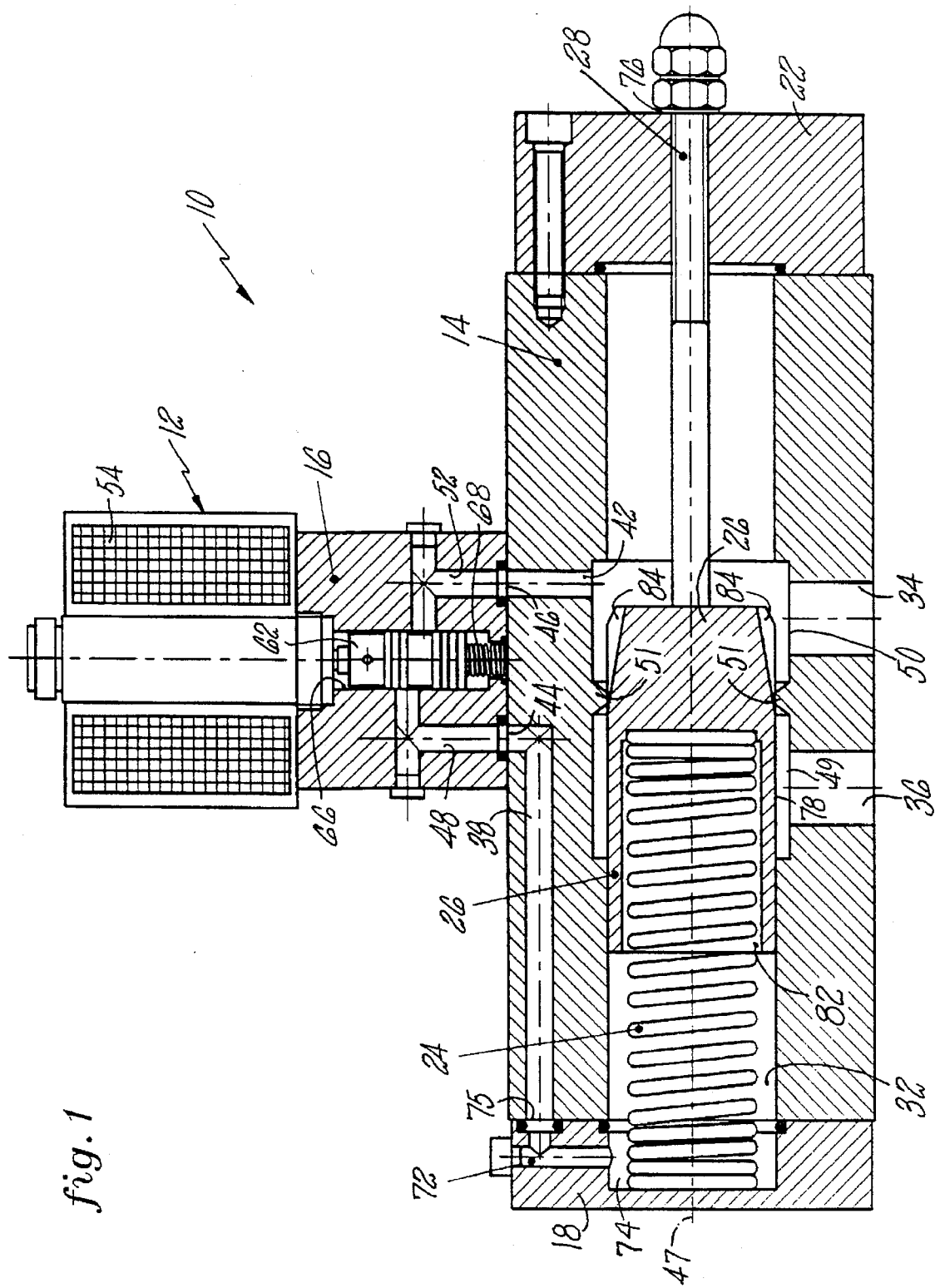
FIG. 1 is a cross-sectional view of a hydraulic valve having a solenoid actuator.

FIG. 1 illustrates a transition valve 10 having a solenoid type actuator 12. The transition valve 10 is a hydraulic valve that includes a block 14, a solenoid valve 16, a first end cap 18, a second end cap 22, a spring 24, a spool 26, and a mechanical stop 28. Although not shown in FIG. 1, the block 14 may include additional passages and associated hardware for other hydraulic functions.

The block 14 has a passage 32 extending through it and which defines a path for sliding motion of the spool 26. The block 14 includes a pair of main flow inlets 34,36 and a pair of pilot flow channels 38,42. The main flow inlets 34,36 open into the passage 32 and, as will be described in more detail later, are in fluid communication with each other upon sufficient movement of the spool 26. The first pilot flow channel 38 has an inlet 44 aligned with a channel 48 of the solenoid valve 16. The second pilot flow channel 42 has an outlet 46 aligned with a channel 52 of the solenoid valve 16. The first pilot flow channel 38 extends through the block 14 to the first end cap 18. The second pilot flow channel 42 extends from its outlet 46 to the passage 32.

The passage 32 extends about a longitudinal axis 47 and includes a first expanded section 49 and a second expanded section 50. The two expanded sections 49,50 are separated by a circumferentially extending, inwardly directed ridge 51.

The solenoid valve 16 is attached to the block 14 and includes a solenoid 54 and the pair of fluid channels 48,52. The solenoid includes a stem 62 that, depending upon the state of the solenoid 54, is either in a first position or a second position. The stem 62 is disposed in a sliding arrangement within a passage 66 of the solenoid valve 16. The stem 62 is engaged with a spring 68 on one end. Engagement with the spring 68 and solenoid 54 positions the stem 62 in either of two positions within the passage 66. In the first position (solenoid 16 is not energized), fluid flows from expanded section 50, through channel 42 and 52, and into channels 48 and 38. In the second position (solenoid 16 energized), fluid communication between channel 48 and channel 52 is blocked by the stem 62. Fluid within channels 38, 48 may flow through a third fluid channel 63 in the solenoid valve 16 (see FIG. 2) and back into the tank.

The solenoid valve 16 is commonly used switching means for moving a valve stem between two positions. Other switching means for opening and closing fluid communication between channels 38 and 42, and thereby main flow inlets 34,36, may be used.

The first end cap 18 is attached, such as by fastening with threaded bolts, in a sealed manner to one end of the block 14. The end cap 18 includes a fluid channel 72 and an opening 74. The fluid channel 72 extends from the outlet 75 of the first pilot flow channel 38 to the opening 72. The opening 72 is a cavity that faces toward the passage 32 of the block 14. The opening also provides a seat for the spring 24.

The second end cap 22 is attached, such as by fastening with threaded bolts, in a sealed manner to the end of the block 14 opposite the first end cap 18. The second end cap includes an aperture 76 extending therethrough and defining means to engage and position the mechanical stop 28.

The spring 24 seats on one end against the first end cap 18 and on the opposite end on the spool 26. The spring deflects along the longitudinal axis of the passage 32 and urges the spool 26 to move toward the end of the passage 32 covered by the second end cap 22.

The spool 26 includes an outer surface 78 that slidingly engages the passage 32, a cavity 82 that defines a seat for the spring 24, and a plurality of tapered slots 84 disposed about the end of the spool 26 opposite the cavity 82. The spool 26 is urged toward the second end cap 22 by the combined force of the spring 24 and fluid pressure on the cavity 82. The spool 26 is urged toward the first end cap 18 by fluid pressure on the face of the spool 26 opposite the cavity 82.

The operation of the transition valve within a hydraulic elevator system will now be described with reference to FIG. 2. This figure is a schematic representation of the hydraulic elevator system, including a car 85 and a hydraulic cylinder 86 for lifting and lowering the car 85.

The process for raising the car begins by energizing a motor 87 that powers a pump 88 to pump oil from a tank 89. This fluid passes through a check valve 90 and, initially, most of the fluid is returned to the tank 89 via a bypass valve 91. A portion of the fluid is a piloting flow that causes an up acceleration valve 92 to move into an acceleration position and the bypass valve 91 begins to close.

The solenoid valve 16 is energized and a piloting flow enters the block 14 to open the transition valve 10 and permit fluid to flow to a main check valve 93. Referring to FIG. 1, energizing the solenoid valve 16 causes the stem 62 to move into the second position. In this position, fluid enters expanded section 50 through main inlet 34 and flows into channels 42 and 52. Fluid communication between channels 52 and 48 is blocked by the stem 62. As a result, fluid pressure builds in section 50 and urges spool 26 to move against the force of spring 24. Movement of spool 26 urges fluid within passage 32 on the spring 24 side of spool 26 to flow through channels 72, 38, 48 and back into tank 89 via the third channel 63. Upon sufficient movement of the spool 26, oil from the pump 88 flows into the first main inlet 34 and out the second main inlet 36. Fluid exiting the second main inlet 36 flows to the main check valve 93.

The main check valve 93 opens once the internal pressure is equal to the pressure on the cylinder 86 side of the main check valve 93. Opening of the main check valve 93 causes fluid to flow into the cylinder 86 and raise the car 85. As the bypass valve 91 closes completely, the car 85 accelerates to full speed.

Deceleration of the car 85 begins by de-energizing the solenoid valve 16 which causes the stem 62 to move into the first position and the transition valve 10 to close under the pressure of the pilot flow and spring 24. Referring to FIG. 1, the pilot flow through the channels 42, 52 flows into channels 48, 38, 72 and in conjunction with the spring 24, urges the spool 26 to move towards the second end cap 22. Upon sufficient movement, the slots 84 are moved beyond the ridge 51 such that the ridge 51 engages the outer surface 78 of the spool 26 to prevent fluid exchange between the first and second main inlets 34,36. Since the transition valve 10 is hydraulically piloted, the deceleration rate is dependent upon the oil pressure within the system.

The increased pressure in the line causes the bypass valve 91 to open, the oil being pumped is directed back to the tank 89, and the car 85 speed reduces to a leveling rate. To stop the car 85, the motor 87 and pump 88 is de-energized causing the pressure in the line to reduce to below the pressure on the cylinder side of the main check valve 93, thus closing the main check valve 93 and stopping the car 85.

The process for lowering the car begins by energizing a down valve 94 and the solenoid valve 16. Opening the down valve 94 directs a piloting flow to begin opening the main check valve 93. Energizing the solenoid valve 16 causes the transition valve 10 to open as discussed previously. Referring to FIG. 1, with the spool 26 moved sufficiently toward the first end cap 18, oil flows into the second main inlet 36 and exits the passage through the first main inlet 34.

Oil flows through the main check valve 93, through the transition valve 10, through the bypass valve 91 and into the tank 89. The car 85 accelerates to full down speed, which is controlled by a pressure control valve 95 which maintains the piloting flow on the main check valve 93 below a predetermined level.

Deceleration of the lowering car begins with de-energizing the solenoid valve 16, which begins to close the transition valve 10. Closing the transition valve 10 reduces the flow of oil between the first and second main inlets 34,36. As before, the rate of deceleration is dependent upon the oil pressure since the transition valve 10 is piloted by the oil pressure. Once the valve 10 is closed, the car 85 is moving at leveling speed. To stop the car 85, the down valve 94 is closed, the pilot flow to the main check valve 93 is stopped, and the main check valve 93 closes.

Figure 3:
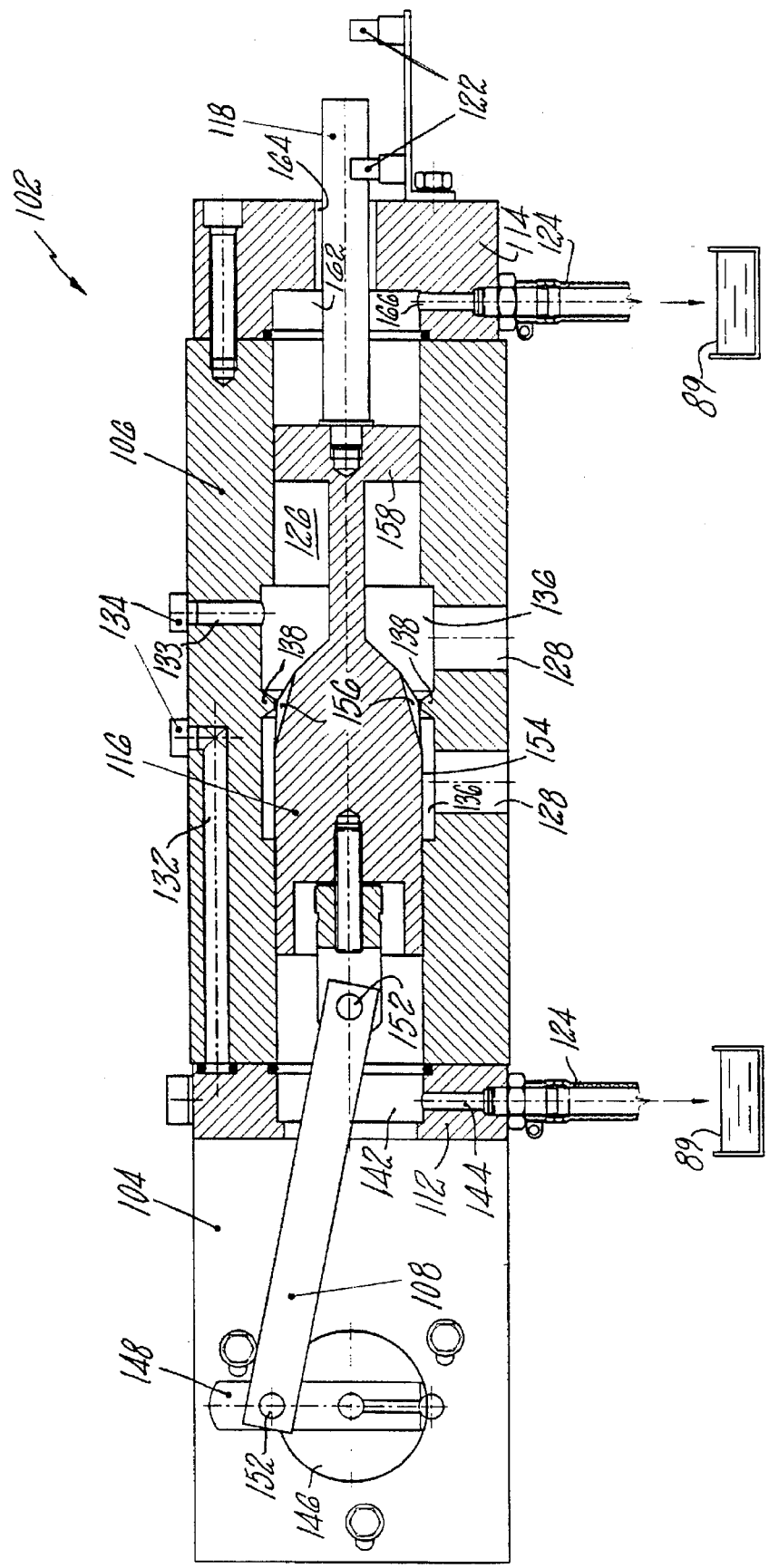
FIG. 3 is a cross-sectional view of a hydraulic valve having a motor actuator.

FIG. 3 illustrates a transition valve 102 having a motor type actuator 104. In this configuration, the valve 102 includes a block 106 that is identical to the block 14 of FIG. 1. The transition valve 102 further includes an arm 108 attached to the actuator 104, a first end cap 112, a second end cap 114, a spool 116, and a projection 118 extending from the spool 116, a pair of limit switches 122, and a pair of drains 124.

As with the block 14 of FIG. 1, the block 106 includes a passage 126, a pair of main flow inlets 128, and a pair of pilot flow channels 132,133. A difference is that the pilot flow channels 132,133 are each capped off by a plug 134. The passage 126 includes a pair of expanded sections 136 and a ridge 138.

The first end cap 112 is attached in a conventional manner, such as by fastening with threaded bolts, to one end of the block 106 and includes an opening 142 that extends through the end cap 112 to define an aperture for the actuating and 108. The first end cap 112 sealingly covers the first pilot flow channel 132 of the block 106. A channel 144 in the first end cap 112 permits leakage fluid to flow into one of the pair of drains 124 and be returned to the tank 89.

The motor actuator 104 includes an electric motor 146 and a crank 148 connecting the motor 146 and the and 108. The arm 108 is connected to the crank 148 and to the spool 116 by pin type connectors 152. Rotation of the motor 146 causes the crank 148 to rotate and move the arm 108, and thereby the spool 116, laterally. This arrangement translates the rotational movement of the crank 148 into linear movement of the spool 116 with a sine curve profile. A sine curve profile minimizes the jerk perceived by the passengers during the deceleration of the elevator. Other types of motor actuators could be used, however, such as screw type mechanical drives connecting the motor and the spool. Movement of the spool 116 opens and closes fluid communication between the main flow inlets 128. Since the lateral surfaces of the spool 116 are exposed via the apertures of the end caps 112, 114, the spool is balanced and requires minimal force from the motor actuator 104 to move the spool 116.

The spool 116 includes an outer surface 154 that slidingly engages the passage 126, the pin connector 152 for the arm 108, and a plurality of tapered slots 156 disposed about the end opposite the pin connector 152. Extending from the end having the slots 156 is a guide 158 that is slidingly engaged with the passage 126 and provides means to maintain the proper orientation of the spool 116. Attached to the guide 158 is the projection 118 that extends outward from the spool 116.

The second end cap 114 is attached to the block in a conventional manner, such as by fastening with threaded bolts. The second end cap 114 includes a recess 162, an aperture 164 sized to permit the projection 118 to move through the second end cap 114, and the other of the pair of drains 124. A channel 166 extends from the recess 162 to the drain 124 to permit leakage fluid to be returned to the tank 89.

The pair of limit switches 122 are disposed outward of the second end cap 114. The limit switches 122 detect the movement of the projection 118 in order to determine the position of the spool 116 and to prevent excessive movement of the spool 116.

Figure 2:
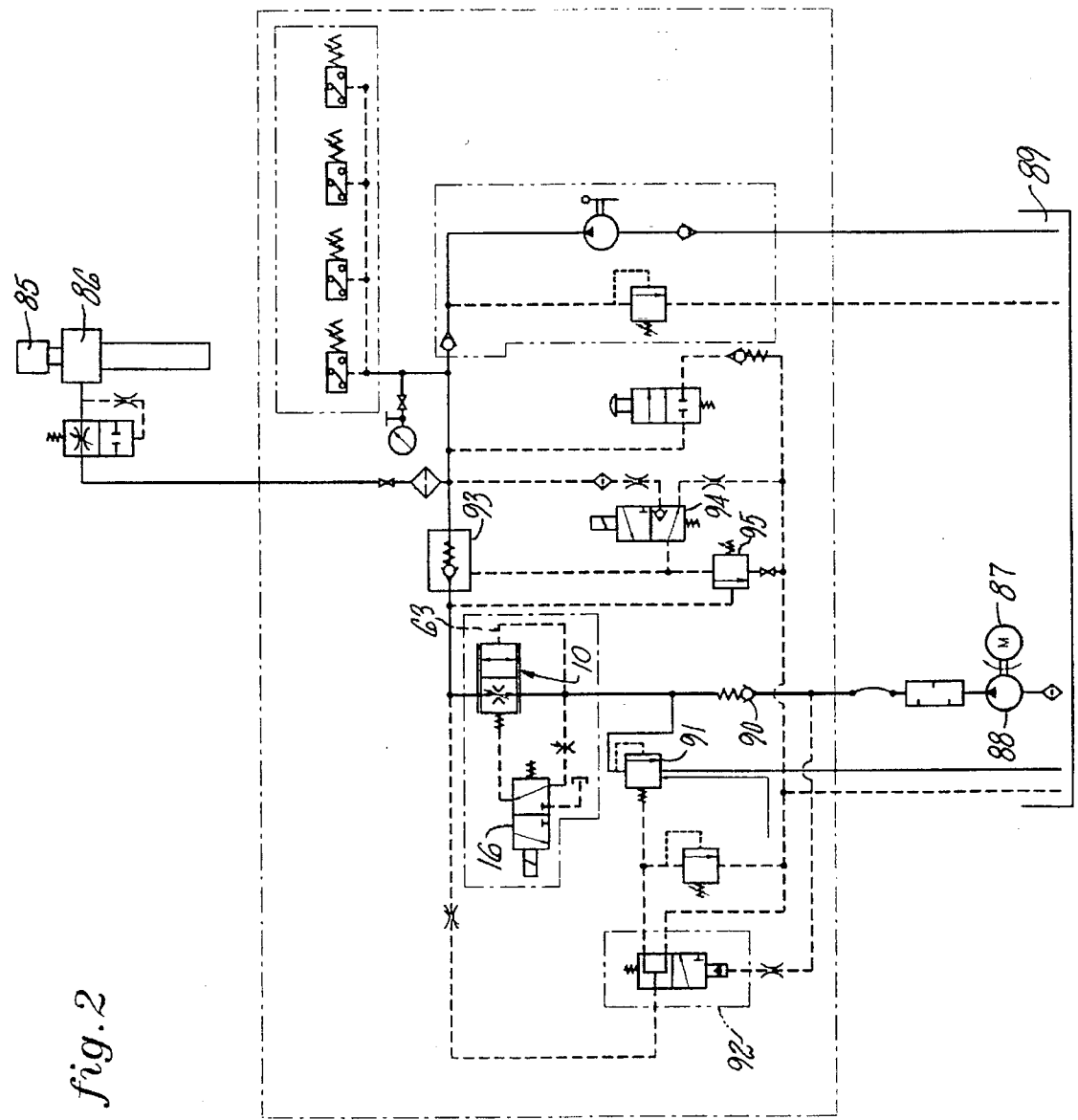
FIG. 2 is a schematic diagram of the control system for the hydraulic elevator including the solenoid actuated hydraulic valve.
Figure 4:
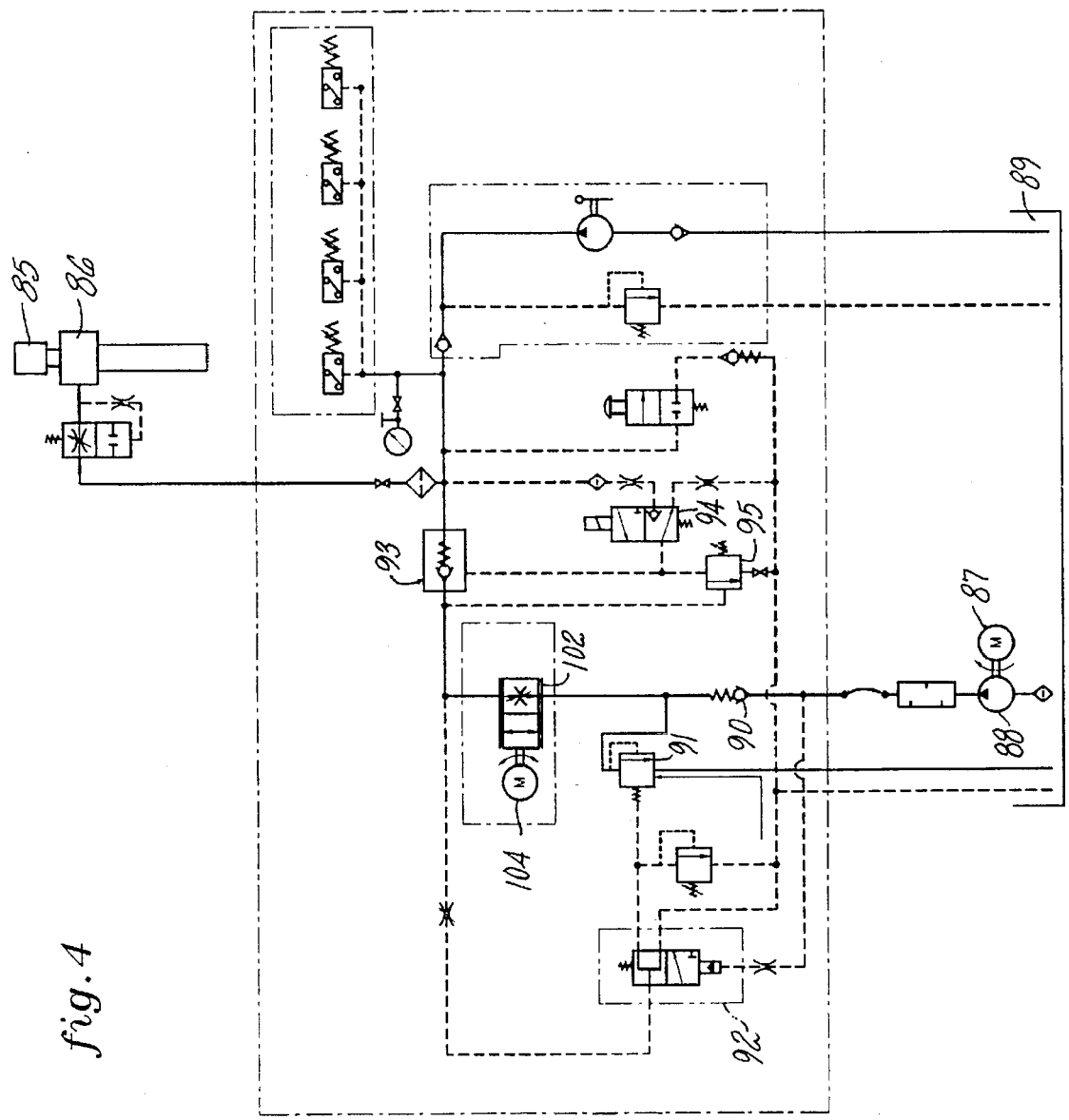
FIG. 4 is a schematic diagram of the control system for the hydraulic elevator including the motor actuated hydraulic valve.

The operation of the hydraulic elevator system having the motor actuated transition valve 102, shown schematically in FIG. 4, is similar to the previous description of the operation of the hydraulic elevator system of FIG. 2. Therefore, only the differences will be discussed.

For the lifting cycle, after the acceleration valve 92 is moved into the acceleration position and the bypass valve 91 begins to close, the motor actuator 104 is energized to open the transition valve 102. Once the valve 102 is opened, the motor actuator 104 is de-energized and the valve 102 remains in the open position until the deceleration phase is reached. To decelerate, the motor actuator 104 is energized to close the valve 102 and reduce the flow of oil to the cylinder 86. Upon closing, the car 85 is at leveling speed. Unlike the solenoid valve 10, the rate of deceleration is dependent primarily on the motor actuator 104 and less on the system fluid pressure. As mentioned previously, the crank and arm arrangement of the motor actuator results in a sine curve speed profile that minimizes the jerk perceived by the passengers during the deceleration phase.

For the lowering cycle, after the down valve 94 is energized, the motor actuator 104 is energized to open the valve 102. Once the valve 102 is open, the motor 104 is de-energized and the valve 102 remains open until the deceleration phase. To decelerate, the actuator motor 104 is energized to close the valve 102 and reduce the flow of oil to the tank 89. Upon closing, the car 85 is at leveling speed. As before, the rate of deceleration is primarily dependent upon the motor actuator 104 and not the system pressure.

The primary advantage of the invention is that the same block may be used with either a solenoid/pilot flow actuator or a motor actuator. This interchangeability reduces the cost associated with fabricating the valves and with maintaining an inventory of spare parts. As an additional benefit, the valve may easily be upgraded from a solenoid actuated valve to a motor actuated valve. To modify the valve to take advantage of the operational improvements of the motorized valve, the following steps may be used: detach the end caps and remove the spool and spring; insert the new spool; attach the new end caps with the projection and the arm extending through the apertures; connect the motor actuator to the valve and arm; attach the drains to the end caps; attach the limit switches to the second end cap; and place plugs over the pilot flow channels of the block. Although not described here, it should be obvious to one skilled in the art that the control system for the elevator would also have to be modified to account for the different actuator of the transition valve.

As shown in FIGS. 1 and 2, the solenoid valve and pilot flow channels define means to actuate the spool within the passage. The arm and associated motor shown in FIGS. 3 and 4 define another means to actuate the spool within the channel. It should be apparent to one skilled in the art that other means to actuate the spool for movement within the passage may be used with the invention.

Although the invention has been shown and described with respect to exemplary embodiments thereof, it should be understood by those skilled in the art that various changes, omissions, and additions may be made thereto, without departing from the spirit and scope of the invention.

What is claimed is:

1. A method to modify a hydraulic elevator having a hydraulically actuated valve to a hydraulic elevator having a motor actuated valve, the hydraulically actuated valve including a block having pilot flow channels, a hydraulically actuated spool, switching means, and an end cap adapted for use with the hydraulically actuated valve, the method including the steps of:

removing the end cap and the switching means from the block;

attaching an end cap having an aperture to the block;

inserting an arm through the aperture and engaging the arm with a spool adapted to be engaged with the arm;

engaging the arm with the motor actuator; and plugging the pilot flow channels of the block.

2. The method according to claim 1, wherein the hydraulically actuated valve further includes a second end cap and a spool position limiting means having a mechanical stop, and wherein the method further includes the steps of:

removing the second end cap and spool position limiting means having a mechanical stop; and attaching a second end cap and spool position limiting means having a projection extending from the spool and through the end cap and a limit switch for detecting the projection.

3. The method according to claim 1, wherein the spool of the hydraulically actuated valve includes a cavity that seats a spring, and further including the steps of:

removing the spool having the cavity; and inserting a second spool adapted to be engaged with the arm.

4. The method according to claim 1, further including the step of attaching a drain to the end cap having an aperture.

* * * * *